June 6, 1972   M. KAPEKER   3,667,785
COUPLER FOR TUBULAR MEMBERS
Filed May 20, 1970
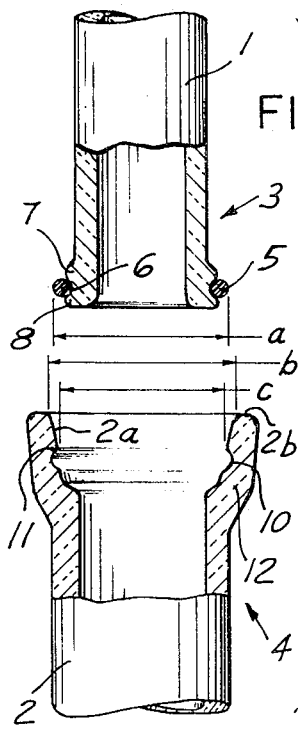
FIG. 1
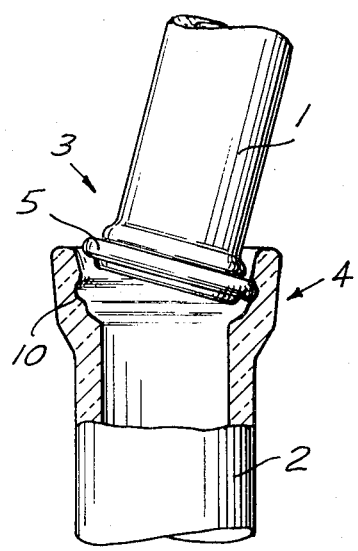
FIG. 3
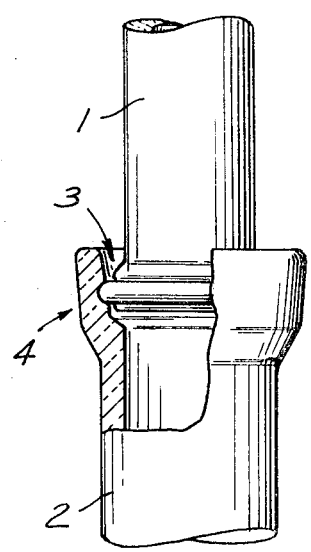
FIG. 2
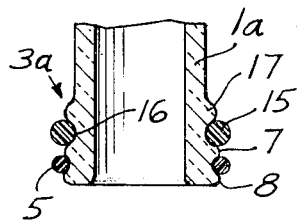
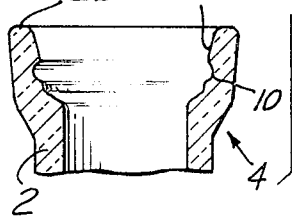
FIG. 4
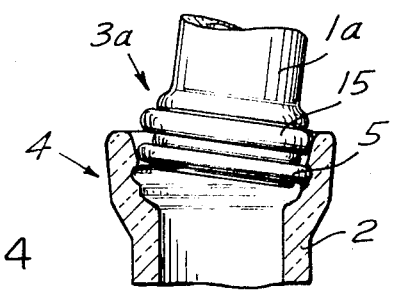
FIG. 6
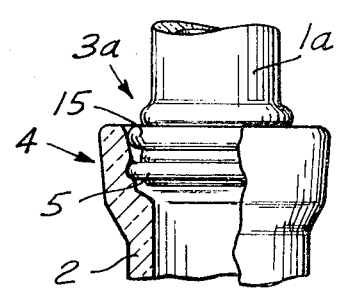
FIG. 5
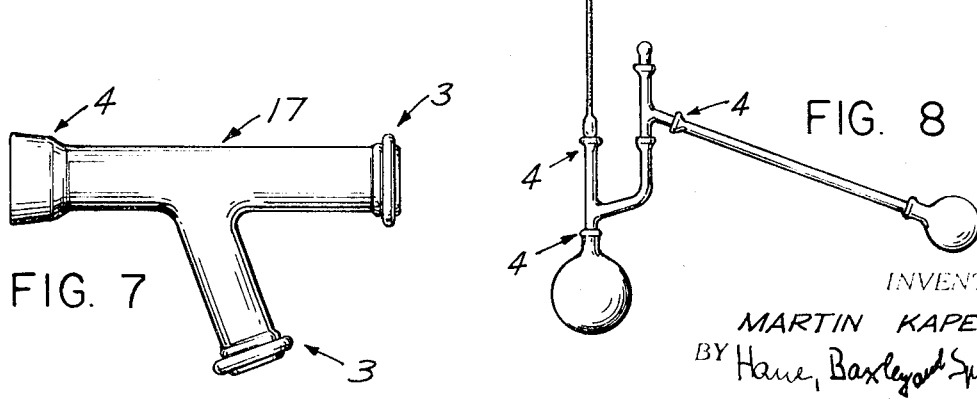
FIG. 7    FIG. 8
INVENTOR.
MARTIN KAPEKER
BY Hane, Baxley and Spiecens
ATTORNEYS

United States Patent Office 3,667,785
Patented June 6, 1972

3,667,785
COUPLER FOR TUBULAR MEMBERS
Martin Kapeker, 41 Decker St., Copiague, N.Y. 11726
Filed May 20, 1970, Ser. No. 39,103
Int. Cl. F16l 21/02, 49/00
U.S. Cl. 285—231
7 Claims

ABSTRACT OF THE DISCLOSURE

A coupler for releasably coupling two tubular members such as glass tubes without affecting substances passing through the tubes comprises an engaging coupling member in the form of an O-ring made of Teflon tightly fitted about an end of one of the tubes and a receiving coupling member in the form of a peripheral groove in the inside wall of an end of the second tube. By forcing the two tube ends into each other while holding the tubes in alignment the O-ring is caused to engage the groove with a pressure fit. Separation of the tubes is effected by slightly tilting the tube having the engaging coupling member with reference to the other tube thereby forcing the O-ring out of engagement with the groove. Airtight coupling is obtained by providing a second O-ring at the engaging coupling member.

---

The present invention relates to a coupler for releasably coupling two generally tubular members.

BACKGROUND

In many fields of application there is a frequent need for releasably coupling two tubular members such as two tubes.

Another frequent requirement is that neither the material of which the tubes, etc. are made nor any parts of the means used for coupling the tubes, etc. affect or contaminate media passing the tubes, etc. in direct or indirect contact therewith.

A further frequent requirement is that the coupling is airtight and that for reasons of economy it can be rapidly and easily connected and equally and rapidly released.

Glass will not contaminate or otherwise affect material in contact therewith and, hence, constitutes a material entirely satisfactory for coupling two tubular members in areas of use where such inertness is essential. However, there is not known now a coupler which is capable of tightly coupling two glass tubes or similar components and can be inexpensively manufactured.

It is at the present time not possible to maintain narrow tolerances for glass tubes or other glass components produced by mass production techniques. A close fit between two mating surfaces of glass tubes requires grinding and polishing of the surfaces to be mated; such grinding and polishing is economically impractical for many fields of use. Moreover, mating glass surfaces even if carefully ground, do not constitute a seal capable of containing an even moderately hard vacuum. Scratches in the ground surfaces as are difficult to avoid in practice, destroy or at least materially reduce the vacuum sealing capability of the coupler. To obtain a satisfactory airtight seal between mating ground glass surfaces a suitable grease such as a silicon type grease must be generally used. While such grease may make the coupler sufficiently airtight, it also tends to affect substances passing through the coupler. Moreover, the lubrication of the mating surfaces as unavoidably caused by the grease tends to result in slipping of the mating surfaces and thus in an unwanted separation of the coupler.

Couplers of the general kind above referred to are widely used in professional laboratory work by biologists, pharmacologists and chemists in general either to couple lengths of tubes to each other or to assemble laboratory equipment such as distilling, refluxing, filtering, washing, etc. equipment. Couplers are also widely used in school and college laboratories, that is, by users less than fully skilled in handling delicate and fragile implements. Moreover, in such laboratories, costs are a particularly important factor.

THE INVENTION

It is an important object of the invention to provide a novel and improved coupler of the general kind hereinabove referred to which permits rapid, safe and convenient releasable coupling of two generally tubular members such as glass tubes and does not in any way affect or contaminate any material with which the coupler may come in contact while in use.

Another important object of the invention is to provide a novel and improved coupler of the general kind hereinabove referred to which effects coupling of the two tubular members by simply inserting the two members into each other and applying axial pressure thereto while the members are held in aligned position. Seperation of the two members is effected similarly rapidly and conveniently by gently forcing the two coupled members out of alignment.

Still another important object of the invention is to provide a novel and improved coupler of the general kind hereinabove referred to which can be inexpensively manufactured and be used very many times for coupling two tubular members without deterioration of its coupling capability due to fatigue of the material used in the coupler.

A further important object of the invention is to provide a novel and improved coupler of the general kind hereinabove referred to which produces a high grade airtight and reliable coupling between tubular members without in any way affecting substances passing through the coupler and which is not likely to separate accidentally.

SUMMARY OF THE INVENTION

The afore pointed out objects, features and advantages and other objects, features and advantages which will be pointed out hereinafter are obtained by providing near the end of one of two glass tubes or other generally tubular members to be coupled, an engaging or male coupling member and near the end of the second tube a receiving or female coupling member. The engaging coupling member comprises an O-ring made of a preferably substantially pure polymerized tetrafluoro ethylene (a synthetic plastic known under the trademark Teflon) and held in a fixed axial position on the outside of the respective tube.

The receiving coupling member comprises a peripheral groove on the inside of the second tube. The configuration of this groove is such that it permits partial entry of the O-ring into the groove and the inner dimensions of the wall portion between the edge of the groove and the adjacent end of the tube are such that the outer diameter of the O-ring freely fits said end portion but that the O-ring can enter the groove only by pressing the two tubes toward each other when and while being held in alignment. Due to such pressure the O-ring becomes slightly deformed and engages the groove edges with a pressure fit. Separation of the tubes is effected by gently tilting the first tube with reference to the second tube. Such tilting forces the O-ring out of the grooves whereupon the tubes can be pulled apart.

Teflon is a rather hard plastic but it has sufficient inherent elasticity to be deformed by the pressure to which it is subjected when it is forced into the groove. Tests have shown that Teflon will not lose its capability of effecting a reliable seal even after the coupler has been used several hundred times. A further important advantage of Teflon is that it is virtually chemically inert so that there is not danger of contamination or deterioration of material coming in contact therewith while passing through the coupled tubes.

In the event it is desired that the coupler is capable of sealing off a fairly hard vacuum such high grade seal is obtained by providing a second O-ring of a comparatively soft elastic material such as soft rubber posterior of the Teflon O-ring. This second ring is so dimensioned that it engages the wall portion between the groove in the receiving coupling member and the adjacent end of the respective tube with a strong pressure fit. The Teflon ring shields the second ring against contact with substances passing through the coupler so that the second ring can be safely made of a material which has a high sealing capability but is not necessarily inert to the passing substances. Tests have shown that even grease may be used at the second ring to improve further the sealing capabilities of the coupler. Due to the afore described retention of the first O-ring in a groove there is also no danger of slipping due to the lubrication caused by the presence of grease.

DETAILED DESCRIPTION OF THE INVENTION

In the accompanying drawing several preferred embodiments are shown by way of illustration and not by way of limitation.

In the drawing:

FIG. 1 is an elevational view, partly in section, of two tubes separated from each other but in position for effecting coupling;

FIG. 2 is an elevational view, partly in section, showing the two tubes of FIG. 1 coupled to each other;

FIG. 3 is an elevational view, partly in section, showing the two tubes in a stage of separation from each other;

FIG. 4 is an elevational view, partly in section, similar to FIG. 1 of a coupler producing a high grade airtight seal, the two members of the coupler being shown separately;

FIG. 5 is an elevational view, partly in section, similar to FIG. 2 showing the two tubes of FIG. 4 coupled to each other;

FIG. 6 is an elevational view, partly in section, similar to FIG. 3 showing the two tubes of the coupler of FIG. 4 in a stage of separation from each other;

FIG. 7 is a diagrammatic view of an adapter with coupling members according to the invention for joining laboratory glassware; and FIG. 8 is a diagrammatic view of steam distillation equipment assembled by means of couplers according to the invention.

Referring now to the figures more in detail and first to the exemplification of the invention as shown in FIGS. 1, 2 and 3, these figures show two tubular members 1 and 2 such as glass tubes to be releasably coupled with a tight fit.

For this purpose one of the tubes, tube 1 in the figures, has at one end an engaging coupling member 3, and the other tube a receiving coupling member 4.

The engaging coupling member comprises an O-ring 5 made of a comparatively hard but elastic and substantially chemically inert synthetic plastic. As stated before, an O-ring made of substantially pure polymerized tetrafluoro ethylene known under the trademark Teflon is highly suitable for the purpose. The O-ring is secured against axial displacement on the outside wall of tube 1 by being held in a peripheral groove 6 preferably formed by ribs 7 and 8 at the opposite peripheral edges of the groove. The ribs and the groove are advantageously formed when the tube is produced. As is best shown in FIG. 3 the O-ring 5 is located closely to the rim of tube 1.

Receiving coupling member 4 comprises a peripheral groove 10 in the inside of tube 2. The inner tube wall portion 2a between the edge of the groove facing rim 2b of tube 2 is slightly outwardly slanted as can best be seen in FIG. 3. The inner peripheral edge of groove 10 is preferably bordered by a peripheral rib 11.

The end of tube 2 at which the just described receiving coupling member 4 is formed, is preferably widened to form a collar 12 so that the tube is not appreciably constricted by the coupling member.

The groove 10 can accommodate therein part of the peripheral wall of O-ring 5. The dimensions of O-ring 5 and of inner tube wall portion 2a are so correlated that the maximal outer diameter $a$ of O-ring 5 is smaller than the diameter $b$ at the outer end of wall portion 2b but larger than the diameter $c$ at the inner end of wall portion 2b as it is indicated in FIG. 1.

The coupler as hereinbefore described functions as follows:

To couple tube 1 to tube 2 the tubes are held in alignment as shown in FIG. 1 and then pressed against each other. O-ring 5 will freely enter wall portion 2a but encounter resistance when it reaches the part of the wall portion having the diameter $c$. By continued axial pressure O-ring 5 is forced past this narrowest part of wall portion 2a until it snaps into groove 10. Due to the pressure to which the O-ring is subjected when in registry with groove 10, it will become slightly deformed, that is, somewhat "ooze" into the groove as can best be seen in FIG. 5. As a result, the O-ring will engage the edges of the groove and thus the inner wall of tube 2 with a pressure fit thereby safely and tightly coupling the two tubes to each other.

FIG. 2 shows the two tubes in the coupled position just described.

To separate the two tubes, tube 1 is slightly tilted with reference to tube 2 as shown in FIG. 3. As a result of such tilting the O-ring is forced out of its pressure engagement with groove 10, the part of the O-ring initially remaining in the groove constituting in effect a fulcrum as is clearly shown in FIG. 3. The afore described correlation of the dimensions of O-ring 5 and wall portion 2a permits such tilting of tube 1 while the engaging coupling member 3 thereon is still in engagement with receiving coupling member 4.

As stated before extensive and prolonged tests have also shown that the tubes can be coupled and separated very many times without deterioration of the sealing action. In other words, the coupling according to the invention has a useful life which is entirely sufficient for all practical purposes.

The coupler according to FIGS. 1, 2 and 3 provides a seal which is liquid-tight and also capable of maintaining a soft vacuum.

FIGS. 4, 5 and 6 show a modification of the coupler which renders the same capable of maintaining a rather hard vacuum. The same reference numerals are applied to corresponding components.

As it is apparent from an inspection of FIGS. 4, 5 and 6, the receiving coupling member 4 is left unchanged but a second O-ring 15 is provided on engaging coupling member 3a. This second O-ring is tightly fitted upon the end portion of tube 1a and is retained similar to O-ring 5 by a peripheral groove 16 defined by peripheral rib 7 and a rib 17. Of course, a separate second rib for retaining ring 15 may also be provided. As it is shown, the outer diameter of O-ring 15 is somewhat larger than the outer diameter of O-ring 5 for a purpose which will become apparent from the subsequent description.

O-ring 15 is made of a suitable soft and elastic material such as soft rubber but many other materials having similar physical properties may also be used. The essential property of the material used for ring 15 is that it is capable of maintaining a high grade seal by pressure engagement with a suitable surface but it is not or less essential that it possesses the same chemical inertness as a material such as Teflon.

Tubes 1a and 2 are coupled to each other in the same manner as has been described in connection with FIG. 2, that is, by pushing the two tubes into each other while being held in aligned position. As it is shown in FIG. 5, O-ring 5 will enter groove 10 in receiving coupler member 4 as previously described and O-ring 15, due to its larger diameter, will engage the slanted wall portion 2a of the receiving coupling member with a pressure fit.

As it is evident, the two O-rings provide two peripheral sealing areas in serial arrangement. The ring 5 produces a liquid-tight and moderately airtight seal and the second O-ring 15 upgrades the airtightness of the seal provided by the coupler as the second ring being soft engages wall portion 2a with a tighter fit than the comparatively stiff Teflon ring 5 engages the surfaces with which it coacts.

As is also evident, the material for sealing ring 15 can be selected primarily for its sealing capabilities rather than for its inertness against any substances which may pass through the tubes since it is shielded against contact by the sealing action of ring 5.

Separation of the coupler is effected in the same manner as has been described in FIG. 3 and as it is shown in FIG. 6.

Couplers according to the invention either of the kind shown in FIGS. 1, 2 and 3 or of the type shown in FIGS. 4, 5 and 6, may be readily used not only to join lengths of tubes but also to assemble laboratory equipment as it is used in school laboratories, professional laboratories or industrial laboratories.

There is shown in FIG. 7 an elbow adapter 17 which has at its ends engaging coupler members 3 of the kind shown in FIG. 1 and a receiving coupling member 4. Of course, any other combination may be used. Moreover, the engaging coupling members may be of the type shown in FIGS. 4, 5 and 6. Any type of tubes or laboratory glassware may be joined by means of the elbow adapter of FIG. 7 provided only that they are equipped with a matching coupling member according to the invention.

FIG. 8 shows laboratory equipment such as a steam distilling assembly the components of which are releasably joined by couplers according to the invention. As is evident, virtually any type of laboratory equipment, whether simple or complex, can be similarly assembled. Such possibility of joining a virtually unlimited variety of equipment components is of great value especially in cost conscious laboratories.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the apppended claims.

What is claimed is:

1. A chemically inert releasable coupler for airtight coupling tubular members, said coupler comprising:
   two tubes;
   an engaging coupling member at one end portion of one of said tubes, said engaging coupling member including a solid O-ring of circular cross-section made of substantially pure polymerized tetrafluoro ethylene tightly fitted upon said end portion radially outwardly protruding therefrom, and retaining means securing said O-ring against axial displacement on said end portion, said retaining means including two axially spaced apart radially protruding peripheral ribs on the outside of said one end portion of one of said tubes, said ribs defining therebetween a groove for retaining the O-ring therein; and
   a receiving coupling member at one end portion of the other tube, said receiving coupler member including a peripheral groove in the inner peripheral wall, said groove being shaped to receive said O-ring with a pressure fit, and the end portion of the receiving coupling member between the rim thereof and the facing edge of said groove having a tapered inner wall decreasing from an inner diameter at the rim larger than the outer diameter of the O-ring to an inner diameter less than the outer diameter of the O-ring at the groove edge facing said rim, said O-ring engaging said groove with a pressure fit when the engaging coupling member is pushed into the receiving coupling member thereby coupling the two tubes to each other with an air-tight and chemically inert joint, said engaging coupling member further comprises a second O-ring made of a soft elastic material tightly fitted upon the end portion of said coupling member posterior of the first O-ring as seen from the rim of said end portion, and wherein second retaining means secure said second O-ring against axial displacement on said end portion, said second O-ring being dimensioned to engage said end portion of the other tube at a peripheral area between the groove of the receiving coupling member and the rim of said end portion with an airtight pressure fit when the two tubes are coupled to each other.

2. The coupler according to claim 1 wherein the axial length and the slant of said tapered wall are correlated to permit limited tilting of the tubes relative to each other with the O-ring located in said groove thereby separating the two tubes from each other.

3. The coupler according to claim 1 wherein said tubes are made of glass.

4. The coupler according to claim 1 wherein the outer diameter of said second O-ring is larger than the outer diameter of said first O-ring.

5. The coupler according to claim 1 wherein said second O-ring is made of a softer elastic material than said first O-ring.

6. The coupler according to claim 5 wherein the second O-ring is made of soft rubber.

7. The coupler according to claim 1 wherein said second retaining means comprise a peripheral groove in the end portion of said one tube.

References Cited

UNITED STATES PATENTS

| | | | |
|---|---|---|---|
| 3,445,120 | 5/1969 | Barr | 285—231 |
| 3,182,918 | 5/1965 | Shive | 285—Dig. 22 |
| 3,304,104 | 2/1967 | Wiltse | 285—321 X |
| 3,224,360 | 12/1965 | Wickenberg et al. | 285—321 X |
| 3,143,845 | 8/1964 | Binford | 285—321 X |
| 738,503 | 9/1903 | Waters | 285—Dig. 22 |
| 2,971,782 | 2/1961 | Sparkman et al. | 285—Dig. 10 |
| 2,726,104 | 12/1955 | Boitnott et al. | 285—Dig. 10 |
| 3,101,984 | 8/1963 | Wieckmann | 285—Dig. 12 |
| 3,246,674 | 4/1966 | Kapeker | 141—363 |

FOREIGN PATENTS

| | | | |
|---|---|---|---|
| 9,765 | 5/1893 | Great Britain | 285—231 |
| 543,733 | 3/1942 | Great Britain | 285—321 |
| 799,162 | 8/1958 | Great Britain | 285—351 |

THOMAS F. CALLAGHAN, Primary Examiner

U.S. Cl. X.R.

277—169, 207; 285—321, 345, 351, Dig. 12, Dig. 22